3,007,967
ALKYL (1-p-MENTHEN-6-YL)KETONES AND PROCESS THEREFOR

Habib Emile Eschinazi, now by judicial change of name Emile Haviv Eschinasi, Montclair, N.J., assignor to The Givaudan Corporation, New York, N.Y., a corporation of New Jersey
No Drawing. Filed Sept. 19, 1958, Ser. No. 761,942
8 Claims. (Cl. 260—587)

This invention relates to novel chemical compounds and to a process for preparing them.

The compounds and process which form the subject of this invention may be represented by the following equation:

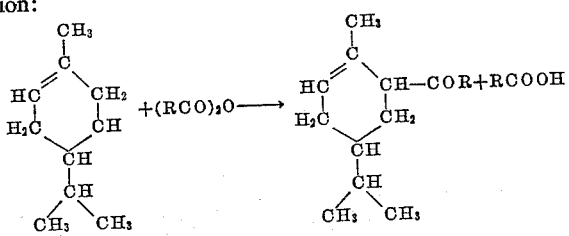

where R is a lower alkyl group.

In general, the process of this invention involves treating 1-p-menthene with an aliphatic acid anhydride in the presence of a suitable catalyst at a temperature around room temperature. As anhydrides which may be used the following are noted: acetic anhydride, propionic anhydride and butyric anhydride. Condensing catalysts, such as zinc chloride, sulfuric acid or phosphoric acid, may be used. Zinc chloride is preferred as it enables the obtaining of optically-active products when the starting 1-p-menthene is optically active. Also, unlike the cases where condensing agents such as sulfuric acid or phosphoric acid are employed, the use of zinc chloride results in the substantial absence of conjugated reaction products as respects the double bond in the nucleus and the carbonyl group of the side chain.

If desired, the reaction may be conducted in the presence of suitable solvents.

The concentrations of the materials employed in the process of this invention may be varied over wide limits. In general, it has been found that the permissive and preferred amounts are as set forth in the following table, it being understood that the parts are in moles:

|  | Permissive Range | Preferred Range |
|---|---|---|
| 1-p-menthene | 1 | 1 |
| Anhydride | 1–3 | 1.2–1.5 |
| Catalyst | 0.1–2 | 0.4–0.5 |

With respect to the conditions under which the herein-described process is conducted, it may be said that a temperature within the range from about 0° C. and 50° C. has been found to give satisfactory results, but that, for practical reasons a temperature within the range from about 20°–35° C. and about 30° C. is preferred. In order to obtain satisfactory yields of the desired products, it has been found that a reaction period of from about 2 to 5 hours is desirable.

The desired reaction product is recovered from the reaction mixture by adding water to the reaction mixture in order to decompose and dissolve the zinc chloride from the formed complex and to free the desired ketone which separates as a top layer.

It is believed particularly noteworthy that while all of the compounds of this invention possess properties which make them suitable for use in perfumery, the aforesaid reaction products where R is ethyl or propyl possess especially desirable olfactory characteristics, the product where R is ethyl being especially noteworthy.

In order more clearly to describe this invention the following examples are given, it being understood that they are for purposes of illustration and not for purposes of limitation.

EXAMPLE I

*Preparation of methyl (1-p-menthen-6-yl)-ketone*

Into a solution of 300 g. of anhydrous zinc chloride in 260 g. of acetic anhydride, 275 g. of 1-p-menthene, ($n_D^{20}$ 1.4568; $\alpha_D$+95°), are added within 30 minutes at a temperature around 30°–38° C. The mixture is then stirred for an additional 2 hours. Then 600 ml. of water are added and the mixture is stirred for 15–20 minutes. The top layer is then separated, neutralized with 10% aqueous caustic soda, separated again and distilled. A light fraction of unreacted hydrocarbons amounting to 65 g. is recovered; then the ketone is obtained at:

82° C. at 3 mm. of mercury pressure and weighs 164 g. and has the following constants—

$$n_D^{20}\ 1.4712;\ \alpha_D-17°,\ d=.9188\ \text{ketone, by}$$
$$\text{oximation 96\%}$$

A residue of about 53 g. is left in the flask.

EXAMPLE II

*Preparation of 1-(1-p-menthen-6-yl)-1-propanone*

Into a solution of 400 g. of anhydrous zinc chloride in 1,100 g. of propionic anhydride, 1,000 g. of 1-p-menthene, $n_D^{20}$ 1.4568, $\alpha_D$95°, as obtained from the hydrogenation of d-limonene with Raney nickel, is slowly introduced within 45 minutes around 30° C. Agitation of the reaction mixture is maintained for an additional 3 hours. Then 1.5 liters of water are introduced within 5–10 minutes and the agitation continued for another half hour. After standing for a few minutes the top layer is separated and washed twice with 1 liter of water under agitation for 5 more minutes. The top layer is then neutralized with a 10% aqueous caustic soda solution until neutral and then separated. One liter of 20% aqueous caustic soda is then added to the resulting top layer; and the mixtures heated to reflux for 3 hours by which time most of the halogenated impurities are eliminated.

Upon distillation of the separated top layer the following cuts are obtained; the pressures being in mm. of Hg and the temperatures in ° C.:

| Cut | B.P. | G. | $n_D$ | $\alpha_D$ | Ketone, percent | Ester, percent |
|---|---|---|---|---|---|---|
| 1. Low boiling | 16 mm./65–67° | 150 | 1.4520–1.4580 | +15—0 | 5 | 0 |
| 2. Intermediate | 3 mm./45–74° | 100 | 1.4580–1.4680 | −20 to −70 | 70 | 30 |
| 3. Main | 3 mm./88–89° | 650 | 1.4690–1.4710 | −80 to −40 | 94–99 | 5–1 |
| 4. Intermediate | 3 mm./90–95° | 90 | 1.4720–1.4740 | −30 to +20 | 98–99 | 1 |
| 5. High boiling | 3 mm./95–110° | 60 | 1.4750–1.4800 | +20 to +40 | 40–50 | |
| 6. Residue | | 100 | viscous polymer | | | |

Cut 1 is constituted mainly of racemized 1-p-menthene.

Cut 2 is the ketone mixed with a substantial amount of ester (30%) as the propionate and may contain some halogenated impurities. It may be retreated with caustic soda to recover the desired ketone.

Cut 3 is the main cut which possesses a characteristic odor of neroli and bergamot and can be used as such.

Cut 4 is also 98–99% pure ketone of good odor. It is partially racemized and should be treated once more with caustic soda if it shows signs of halogen impurities.

Cut 5 may contain some traces of halogens. It is pale yellow in color and shows about 40% ketone content with a substantial amount of a terpene dimer. It may be retreated with caustic soda and redistilled to recover the ketone.

When the reaction is carried with racemic 1-p-menthene also known as carvomenthene the reaction product is devoid of any optical activity, but is otherwise the same as the one obtained when d-1-p-menthene is used.

The odor when fresh is strong, smooth and leafy recalling the odor of crushed orange leaves or the odor of the commercial essential oil steam distilled from some species of orange tree leaves and twig ends and known as oil petitgrain. This note persisted about forty-eight hours attenuating slowly after five hours.

A mixture was made with 1 part of the compound made in accordance with this example and 99 parts of white milled toilet soap stock. The soap stock odor was very well covered. The perfuming agent gave the soap a strong and very pleasant petitgrain like odor, which owing to the importance of natural petitgrain oil in soap perfuming and to the economic desirability of using as much of synthetic perfuming agents as possible in the formulation of soap perfumes, is considered to be an important contribution to soap perfumery.

EXAMPLE III

*Preparation of 1-(1-p-menthen-yl)-1-butanone*

Into a solution of 300 g. of anhydrous zinc chloride in 410 g. of butyric anhydride is added in the course of 30 minutes 275 g. of 1-p-menthene ($n_D$ 1.4568; $\alpha_D+95°$) at a temperature of 30°–35° C. The reaction mixture is stirred for an additional 2 hours and the temperature reaches 38° C. Then the agitation is continued for 3 more hours at this temperature and the mixture is then poured into 600 ml. of ice water stirred for 5–10 minutes and then the top layer is separated. The bottom layer is extracted with 50 ml. of benzene and the extract is combined with the top layer and neutralized with 10% aqueous NaOH solution. After separation, the top organic layer is distilled. A low boiling cut of hydrocarbons amounting to about 45 g. is first collected; it is then followed by the desired ketone boiling at:

80° C. at 1 mm. of mercury pressure with the following constants—

$n_D^{20}$ 1.4679–1.4700  $\alpha_D$ −42° to −35°, ketone by oximation=93%. Yield 280 g.

Some higher boiling cuts are then recovered (60 g.) and a residue of about 40 g. is left in the pot.

The odor when fresh is weak and leafy resembling only somewhat the oil of petitgrain and having a pronounced horse stable by-odor. After about one hour the odor became more animal like and attenuated rapidly. It still persisted about forty-eight hours.

When incorporated in the aforesaid soap stock in the amounts used in accordance with Example II, it was found that the novel compound fairly well covered the soap stock odor, but to a much less extent than did the compound of Example II. Indeed, it appears that the odor strength of the novel compound of Example II in soap is about 10 times that of the novel compound of Example III.

It will be understood that the specification and claims herein include, whenever the context so admits or requires not only the racemic forms of the novel compounds herein described but also their optically-active forms.

The foregoing illustrates the practice of this invention which, however, is to be construed as broadly as permissible in view of the prior art and limited solely by the appended claims.

What is claimed is:

1. The chemical compounds represented by the following structural formula:

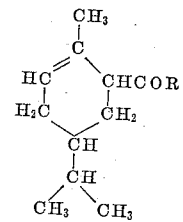

wherein R is a lower alkyl radical.

2. The chemical compound, methyl (1-p-menthen-6-yl)-ketone having the following structural formula:

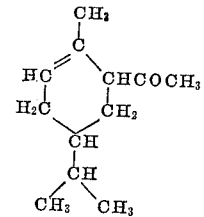

3. The chemical compound, 1-(1-p-menthen-6-yl)-1-propanone, having the following structural formula:

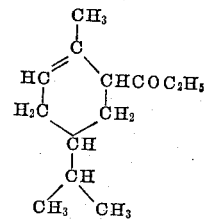

4. The chemical compound, 1-(1-p-menthen-6-yl)-1-butanone, having the structural formula:

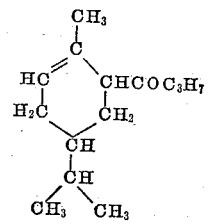

5. The process for making compounds represented by the following structural formula:

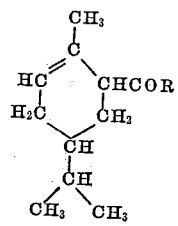

wherein R is a lower alkyl radical, which comprises reacting 1-p-menthene and an aliphatic acid anhydride of the formula, $(RCO_2)O$, wherein R is a lower alkyl group, in the presence of zinc chloride at a temperature within the range from about 0° C. to about 50° C.

6. The process for making methyl (1-p-menthen-6-yl) ketone, which comprises reacting 1-p-menthene and acetic anhydride in the presence of anhydrous zinc chloride at a temperature within the range from about 0° C. to about 50° C.

7. The process for making 1-(1-p-menthen-6-yl)-1-propanone, which comprises reacting 1-p-menthene and propionic anhydride in the presence of anhydrous zinc chloride at a temperature within the range from about 0° C. to about 50° C.

8. The process for making 1-(1-p-menthen-6-yl)-1-butanone, which comprises reacting 1-p-menthene and butyric anhydride in the presence of anhydrous zinc chloride at a temperature within the range from about 0° C. to about 50° C.

References Cited in the file of this patent

Colonge et al.: Bull. Soc. Chim. (France), vol. 7, pages 459–68 (1940).

Colonge et al.: Chem. Abstracts, vol. 36, pages 2842–3 (1942).

Royals et al.: J. Org. Chem., vol. 15, pages 1147–54 (1950).

UNITED STATES PATENT OFFICE
CERTIFICATE OF CORRECTION

Patent No. 3,007,976                                November 7, 1961

Karl Eiter et al.

It is hereby certified that error appears in the above numbered patent requiring correction and that the said Letters Patent should read as corrected below.

Column 2, line 15, for "1,4-diene" read -- 1,5-diene --; line 68, for "ionine" read -- ionone --; column 4, line 24, after "A" insert a comma; line 43, for "$n_D^{320}$" read -- $n_D^{20}$ --; line 59, for "components" read -- component --.

Signed and sealed this 3rd day of April 1962.

(SEAL)
Attest:

ERNEST W. SWIDER                                DAVID L. LADD
Attesting Officer                                    Commissioner of Patents